United States Patent
Saito et al.

(10) Patent No.: US 6,829,889 B2
(45) Date of Patent: Dec. 14, 2004

(54) EXHAUST GAS CLEANING DEVICE FOR INTERNAL COMBUSTION ENGINE

(75) Inventors: Makoto Saito, Okazaki (JP); Shigeto Yahata, Kariya (JP); Tsukasa Kuboshima, Okazaki (JP); Shinichiro Okugawa, Toyota (JP)

(73) Assignee: Denso Corporation, Kariya (JP)

( * ) Notice: Subject to any disclaimer, the term of this patent is extended or adjusted under 35 U.S.C. 154(b) by 35 days.

(21) Appl. No.: 10/460,191

(22) Filed: Jun. 13, 2003

(65) Prior Publication Data

US 2003/0230075 A1 Dec. 18, 2003

(30) Foreign Application Priority Data

Jun. 14, 2002 (JP) ......................................... 2002-174467

(51) Int. Cl.$^7$ ............................................... F01N 3/00
(52) U.S. Cl. .............................. 60/291; 60/284; 60/287; 60/295; 60/297
(58) Field of Search .......................... 60/284, 285, 286, 60/287, 291, 295, 297, 311; 55/DIG. 30

(56) References Cited

U.S. PATENT DOCUMENTS

| | | | | |
|---|---|---|---|---|
| 4,969,328 A | * | 11/1990 | Kammel ........................ 60/275 |
| 5,063,736 A | * | 11/1991 | Hough et al. .................. 60/286 |
| 5,716,586 A | * | 2/1998 | Taniguchi ...................... 422/173 |
| 6,725,652 B2 | * | 4/2004 | Sakaguchi ..................... 60/297 |
| 6,735,941 B2 | * | 5/2004 | Saito et al. ..................... 60/295 |

FOREIGN PATENT DOCUMENTS

| | | |
|---|---|---|
| JP | 7-332065 | 12/1995 |
| JP | 10-89048 | 4/1998 |
| JP | 2001-280118 | 10/2001 |

* cited by examiner

*Primary Examiner*—Binh Q. Tran
(74) *Attorney, Agent, or Firm*—Nixon & Vanderhye P.C.

(57) ABSTRACT

The recycling timing schedule for a diesel particulate filter (DPF) can be easily and accurately determined. There is a differential pressure sensor that detects differential pressure ΔP in the DPF, and an airflow meter that detects the flow velocity v in an exhaust path. An ECU calculates the quantity of deposited fine exhaust particles ML according to:

$$ML=[\Delta P-(A\mu v+C\rho v^2)]/(B\mu v+D\rho v^2)$$

Recycling of the filter is determined according to a determination formula used to compare the calculated deposited quantity ML to a reference quantity. In this way, the deposited quantity can be accurately obtained without using a map.

7 Claims, 6 Drawing Sheets

EXHAUST GAS CLEANING DEVICE FOR INTERNAL COMBUSTION ENGINE

CROSS REFERENCE TO RELATED APPLICATION

This application is based upon, claims the benefit of priority of, and incorporates by reference, the contents of Japanese Patent Application No. 2002-174467 filed Jun. 14, 2002.

BACKGROUND OF THE INVENTION

1. Field of the Invention

The present invention relates to an exhaust gas cleaning device for an internal combustion engine, and more particularly, the invention relates to the technology of recycling a particulate filter.

2. Description of the Related Art

Generally, there is increasing demand for the continual reduction of exhaust emissions from internal combustion engines used in automobiles and the like, and particularly in compression ignition type diesel engines that use diesel oil as fuel. CO, HC, and NOx are not the only gases desired to be removed from the exhaust gas, but also smoke and fine exhaust particles such as SOF contained in the exhaust gas. Therefore, a particulate filter is provided in the exhaust path to capture the fine particles contained in the exhaust gas.

The particulate filter lets an incoming exhaust gas pass through its porous diaphragm to capture fine particles present in the exhaust gas on the surface or fine pores of the diaphragm. As the quantity of particles to be captured and deposited increases to an excessive quantity, the back pressure in the internal combustion engine is raised as the flow resistance caused by the particulate filter increases. This decreases the performance of the engine. Therefore, fine exhaust particles captured by the particulate filter must be appropriately removed from the filter, so that the particulate filter can be recycled to restore its capability of capturing fine particles from the exhaust.

A known particulate filter includes an oxidation catalyst, such as platinum, provided in the filter enabling it to be recycled by the oxidation function of the catalyst during operation of the internal combustion engine. In this particulate filter, for example, post injection of fuel in the exhaust process supplies fuel to the particulate filter, so that the heat from the catalytically oxidized fuel is used to oxidize and remove deposited fine exhaust particles that are not oxidized as easily as the injected fuel.

Frequent recycling of the particulate filter degrades fuel efficiency while, if the recycling interval is too long, part of the excess of the deposited fine exhaust particles could abruptly burn, resulting in the particulate filter attaining abnormally high temperatures and becoming damaged. Therefore, the quantity of the deposited fine exhaust particles is preferably measured to determine when to start recycling. According to the disclosure of Japanese Patent Laid-Open Publication No. Hei 7-332065, the differential between the pressure at the inlet and at the outlet of the particulate filter is measured to allow a determination based on the fact that the differential pressure increases because of an increase in the flow resistance caused by the increased quantity of fine exhaust particles in the filter. Then, the point in time when the detected differential pressure is beyond a prescribed value is determined as the recycling time.

According to Japanese Patent Laid-Open Publication No. Hei 7-332065, however, the quantity of deposited fine exhaust particles could be different for the same detected differential pressure, depending on the operation state of the internal combustion engine. Accordingly, the quantity of deposited fine exhaust particles cannot necessarily be determined with sufficient accuracy. Detailed maps for different operation states could be stored, but cannot be easily provided for, as a large storage capacity would be necessary.

SUMMARY OF THE INVENTION

The invention is directed to a solution to the above-described disadvantage, and it is an object of the present invention to provide an exhaust gas cleaning device for an internal combustion engine in a simple structure that can properly determine the time of recycling the filter.

The inventors have researched and studied the particulate filter in connection with the deposition of fine exhaust particles and its effect upon the flow of the exhaust gas, and have found that the following model equation is established.

$$\Delta P = M\mu v + N\rho v^2$$

wherein $\Delta P$ is the differential between the pressure at the inlet side and the outlet side of the particulate filter, i.e., the pressure loss in the particulate filter, $v$ is the flow velocity of the exhaust gas flowing through the particulate filter, $\mu$ is the viscosity of the exhaust gas, and $\rho$ is the density of the exhaust gas. The coefficients M and N become larger as the quantity of the deposited fine exhaust particles becomes larger. More specifically, M or N is substantially a linear function of the deposited quantity ML, and when the deposited quantity is beyond a certain value, the ratio of change of M, N relative to the deposited quantity ML is reduced. The ratio changes before and after the certain value because the pressure loss in the particulate filter is initially increased according to the ratio of fine pores filled with fine exhaust particles to the fine pores in the particulate filter. Then, once almost all the pores are filled with fine exhaust particles, the pressure loss should change based on the thickness of the layer of deposited fine exhaust particles. The present invention is based on the findings.

According to a first aspect of the invention, an exhaust gas cleaning device for an internal combustion engine with a particulate filter provided in an exhaust path for capturing fine exhaust particles includes a differential pressure detecting means for detecting a differential between the pressure at the inlet side and the outlet side of the particulate filter, a flow velocity detecting means for detecting a flow velocity of an exhaust gas flowing through the particulate filter, and a recycling determining means for determining whether or not to recycle the particulate filter according to a determination formula for determining a value of a quantity of fine exhaust particles deposited in the particulate filter based on the detected differential pressure and flow velocity. The determination formula is equivalent to the following formula:

$$\Delta P \geq M\mu v + N\rho v^2$$

wherein $\Delta P$ is the differential pressure, $v$ is the flow velocity, $\mu$ is the viscosity of the exhaust gas flowing through the particulate filter, $\rho$ is the density of the exhaust gas, and M and N are constants. When the formula is satisfied, the particulate filter is allowed to be recycled.

As described above, in relation to the exhaust gas flow in the particulate filter, $\Delta P \geq M\mu v + N\rho v^2$ is established, and therefore when M and N are obtained for a reference deposited quantity, the value of the deposited quantity of the fine exhaust particles can accurately be determined based on the determination formula. In this way, the size of data to be stored is not as large as a map.

According to a second aspect of the invention, in the configuration according to the first aspect, the recycling determining means allows the deposited quantity to be calculated by the following determination formula:

$$ML=[\Delta P-(A\mu v+C\rho v^2)]/(B\mu v+D\rho v^2),$$

wherein ML is the deposited quantity, A, B, C, and D are constants, and the determination formula is used to compare the value of the calculated deposited quantity and a predetermined deposited quantity.

As described above, M and N are a linear function of the deposited quantity ML, and therefore the above calculation formula for ML is established in the model formula:

$$\Delta P=M\mu v+N\rho v^2$$

so that the deposited quantity of the fine exhaust particles is objectively available.

According to a third aspect of the invention, in the configuration according to the second aspect, the recycling determining means stores two calculation formulas for the deposited quantity having different values for the constants A, B, C, and D, one calculation formula is adapted to a deposited quantity in a range equal to or less than a predetermined reference value, while the other formula is adapted to a deposited quantity within a range equal to or more than the reference value, and when the deposited quantity calculated according to one calculation formula is out of the range of the deposited quantity to which the calculation formula is adapted, the deposited quantity is calculated again according to the other calculation formula.

When the chief cause for pressure loss in the particulate filter changes, a more appropriate determination formula is selected, and therefore the deposited quantity of the fine exhaust particles can be more accurately obtained.

According to a fourth aspect of the invention, in the configuration according to the second or third aspect, the particulate filter has an oxidation catalyst for oxidizing and burning the fine exhaust particles deposited therein. The device further includes a means for detecting reduction in the calculated deposited quantity during the recycling of the particulate filter, and a catalyst degradation determining means for determining the oxidation catalyst as being further degraded when the calculated deposited quantity is more slowly reduced.

When the oxidation catalyst is degraded and its oxidizing capability is lowered, the burning speed of the deposited fine exhaust particles is reduced during recycling of the particulate filter, so that the rate of reduction in the deposited quantity is lowered. As a result, whether or not the particulate filter is malfunctioning or degraded can be determined based on the reduction in the calculated deposited quantity.

According to a fifth aspect of the invention, in the configuration according to any one of the first to fourth aspects, the device further includes a temperature detecting means for detecting a temperature of the exhaust gas that flows through the particulate filter. The recycling determining means is set to obtain the viscosity $\mu$ based on the detected temperature according to a previously stored relation between the viscosity and the temperature of the exhaust gas.

Since the viscosity $\mu$ of the exhaust gas is more accurately obtained, a more appropriate determination formula can be provided.

According to a sixth aspect of the invention, in the configuration according to any one of the first to fifth aspects, the device includes a temperature detecting means for detecting a temperature of the exhaust gas that flows through the particulate filter. The recycling determining means is set to obtain the density $\rho$ based on the detected temperature according to a previously stored relation between the density and temperature of the exhaust gas. Since the density $\rho$ of the exhaust gas is more accurately obtained, a more appropriate determination formula can be provided.

According to a seventh aspect of the invention, in the configuration according to any one of the first to sixth aspects, the flow velocity detecting means includes an intake air quantity detecting means for detecting a quantity of air taken into the internal combustion engine, and a correcting means for adding a volume increase caused by combustion of injected fuel to an intake air quantity, thereby producing a volume flow rate of the exhaust gas that flows through the particulate filter. Then, the volume flow rate is converted into a flow velocity.

When injected fuel is burned in cylinders, the volume flow rate of the exhaust gas surpasses the intake air quantity depending on the quantity of fuel supplied for burning. Therefore, the volume flow rate of the exhaust gas can accurately be obtained without directly measuring the exhaust gas containing the fine exhaust particles. The flow velocity of the exhaust gas that flows through the particulate filter is proportionate through a coefficient defined by the shape of the particulate filter and can be converted from the volume flow rate.

When the flow rate of the exhaust gas containing the fine exhaust particles from the cylinders is directly detected, the detection characteristic could be affected by the contamination of the detection sensor with the fine exhaust particles. However, the flow rate of relatively clean intake air needs only to be detected, and therefore the detection characteristic is not affected, and highly reliable detection can be achieved for the flow velocity of the exhaust gas. Furthermore, an internal combustion engine is provided with an airflow meter that serves as a typical intake air detecting means, and the intake air quantity detected by the airflow meter can directly be used, in other words, the detection can be carried out in a simple structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
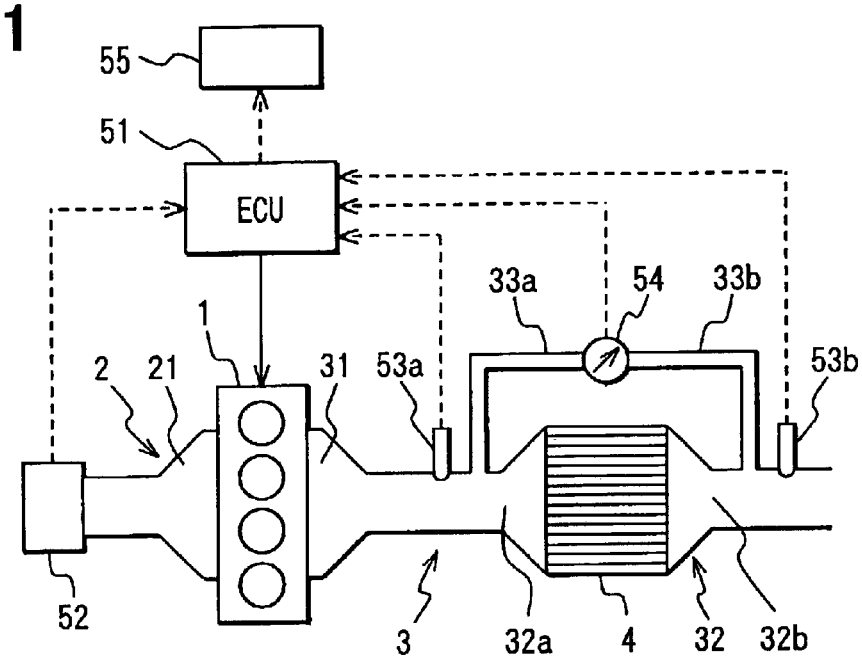
FIG. 1 shows the configuration of an internal combustion engine to which an exhaust gas cleaning device according to the invention is applied.

FIG. 1 shows the configuration of a diesel engine according to a first embodiment of the invention. In the diesel engine, an engine main body 1 includes four cylinders. The main body is connected with an intake manifold 21 located at the most downstream part of an intake path 2, and an exhaust manifold 31 at the most upstream part of an exhaust path 3. In the exhaust path 3, the gathering part of the exhaust manifold 31 is coupled with a particulate filter 32. The particulate filter 32 has a main filter body 4 formed by blocking the paths of a honeycomb body made of a porous ceramic such as cordierite and silicon carbide. The exhaust gas from the cylinders of the engine main body 1 coming in from the inlet 32a passes through the porous diaphragm and flows downstream from the outlet 32b. At that time, the particulate filter 32 captures fine exhaust particles contained in the exhaust gas, and the particles are deposited progressively as the traveled distance increases. An oxidation catalyst, having a rare metal such as platinum and palladium as a main constituent, is carried on the surface of the main filter body 4 of the particulate filter 32. This oxidizes and burns the fine exhaust particles in a temperature condition prescribed for removal.

An ECU 51 controls various parts of the engine such as the injector of the engine main body 1. The ECU 51 receives various input signals indicating the operational state. These signals include a signal used to determine the quantity of fine exhaust particles deposited in the particulate filter 32, with a sensor for obtaining this signal being provided. More specifically, temperature sensors 53a and 53b are temperature detecting means provided through a pipe wall in the exhaust path 3 in order to detect the exhaust temperature. The temperature sensors 53a, 53b are provided immediately upstream and downstream, respectively, of the particulate filter 32. The temperature detected by the temperature sensor 53a is the temperature of the exhaust gas flowing at the inlet 32a of the particulate filter 32, and will hereinafter be referred to as the "DPF inlet temperature." The temperature detected by the temperature sensor 53b is the temperature of the exhaust gas flowing at the outlet 32b of the particulate filter 32, and will hereinafter be referred to as the "DPF outlet temperature."

The exhaust path 3 is connected with a first branch path 33a that branches immediately upstream of the particulate filter 32, and a second branch path 33b that branches immediately downstream of the particulate filter 32. A pressure sensor 54 serving as the differential pressure detecting means is provided in the branch paths 33a, 33b and detects the difference between the pressure at the inlet 32a and at the outlet 32b of the particulate filter. The differential pressure indicates the pressure loss due to the particulate filter 32. An airflow meter 52 serving as the intake air quantity detecting means is provided in the intake path 2 and detects the intake air quantity.

It is understood that the ECU 51 is provided with other input parameters associated with operational states, such as an accelerator opening and the temperature of the cooling water. The ECU 51 has a common structure with a microcomputer as a main element. Its ROM stores control programs to control various parts of the internal combustion engine as well as programs used for calculating the quantity of fine exhaust particles deposited in the particulate filter 32. Additionally, the ROM stores information used to specify determination formulas used for the calculation programs. The determination formulas will be described later. Whether or not to recycle the particulate filter 32 is determined based on the calculated deposited quantity.

Figure 2:
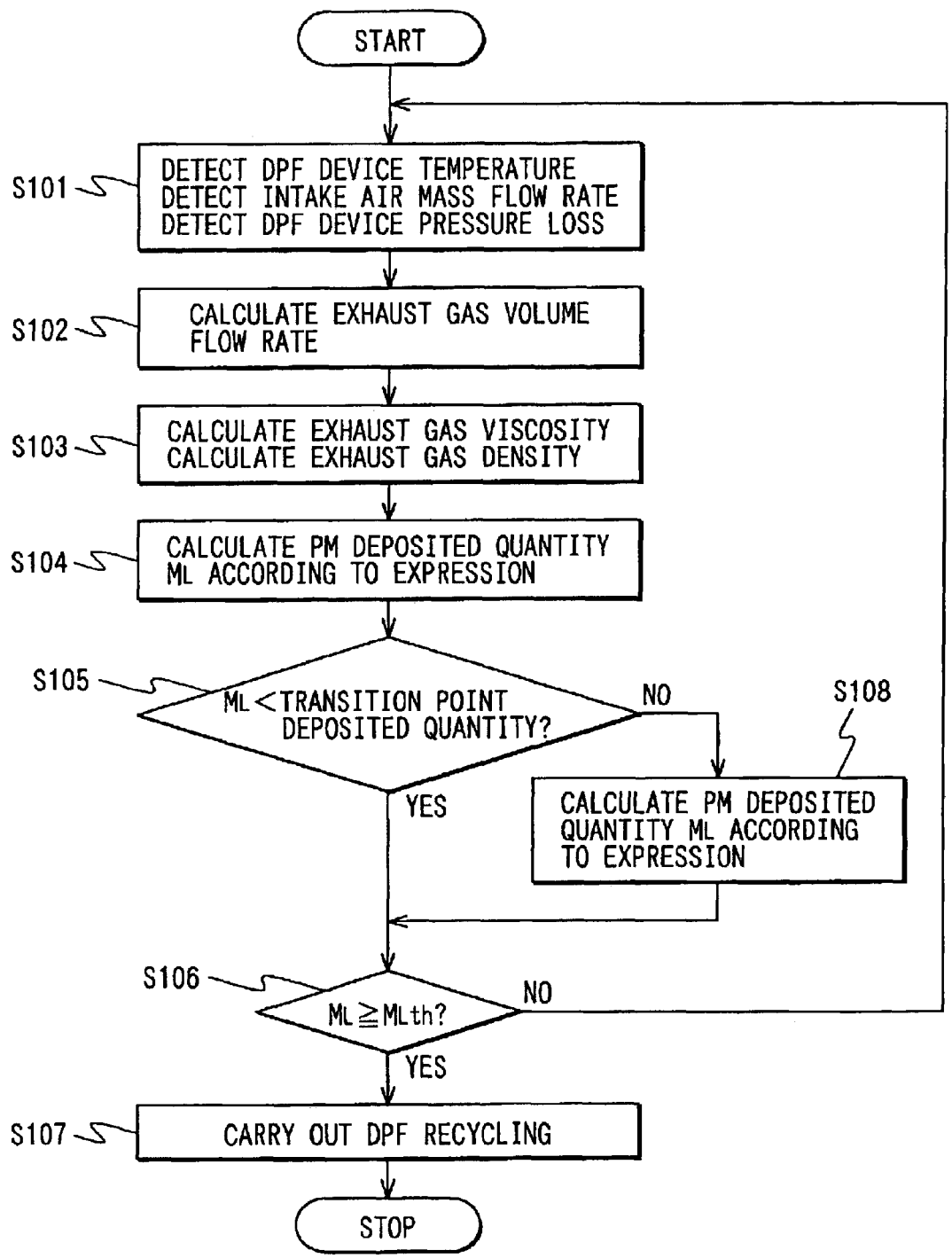
FIG. 2 is a first flow chart for use in illustration of the content of control carried out by an ECU that controls various parts in the internal combustion engine.

FIG. 2 shows the contents of control steps related to the recycling of the particulate filter 32 carried out by the ECU 51. To begin with, in step S101, the DPF temperature, the intake air quantity, and the pressure loss are obtained. The DPF temperature is obtained by an operation based on the DPF inlet temperature and the DPF outlet temperature. Since the DPF inlet temperature greatly fluctuates, the temperature after processing with a primary delay filter is preferably used. Herein, the intake air quantity is represented by the mass flow rate.

Step S102 is a process acting as the correcting means for the ECU 51. The ECU 51 and the airflow meter 52 form the flow velocity detecting means. In step S102, the volume flow rate of the exhaust gas is calculated. The calculation is performed according to expression (1). Note that the airflow meter 52 is located upstream of the intake manifold 21.

$$\begin{aligned}
\text{Volume flow rate} \\
(m^3/\text{sec}) = &[\text{intake air quantity } (g/\text{sec})/28.8 \ (g/\text{mol})] \times \\
& 22.4 \times 10^{-3} \ (m^3/\text{mol}) \times [DPF \text{ temperature } (K)/273 \\
& (K)] \times [\text{atmospheric pressure } (kPa)/(\text{atmospheric} \\
& \text{pressure } (kPa) + \text{differential pressure } (kPa))] + \\
& \text{fuel injection quantity } (cc/\text{sec})/207.3 \ (g/\text{mol})] \times \\
& 0.84 \ (g/cc) \times 6.75 \ (\text{moles}) \times 22.4 \times 10^{-3} \\
& (m^3/\text{mol}) \times [\text{atmospheric pressure } (kPa)/ \\
& (\text{atmospheric pressure } (kPa) + \text{differential pressure } (kPa))]
\end{aligned} \quad (1)$$

The first term of expression (1) is the intake air quantity converted from the mass flow rate into the volume flow rate. The second term is the increase in the exhaust gas relative to the intake air quantity. In the second term, 0.84 (g/cc) is the typical liquid density of diesel oil. The value "6.75

(moles)" is the increase in the number of moles corresponding to 1 mole of the injected fuel.

The increase (6.75 (moles)) is obtained as follows. The typical composition of diesel oil is $C_{15}H_{27.3}$ (molecular weight: 207.3), and the reaction formula during combustion is as follows:

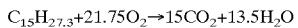

$$C_{15}H_{27.3}+21.75O_2 \rightarrow 15CO_2+13.5H_2O$$

Therefore, the increase in the number of moles is 6.75 (=(15+13.5)−21.75) relative to 1 mole of the injected fuel. The fuel is intermittently injected in a prescribed injection timing determined by the ECU 51. The fuel injection quantity in expression (1) is the average fuel injection quantity over both injection and non-injection periods. The volume flow rate of the exhaust gas is divided by the effective path area of the particulate filter 32 and converted into a flow velocity.

Figure 3:
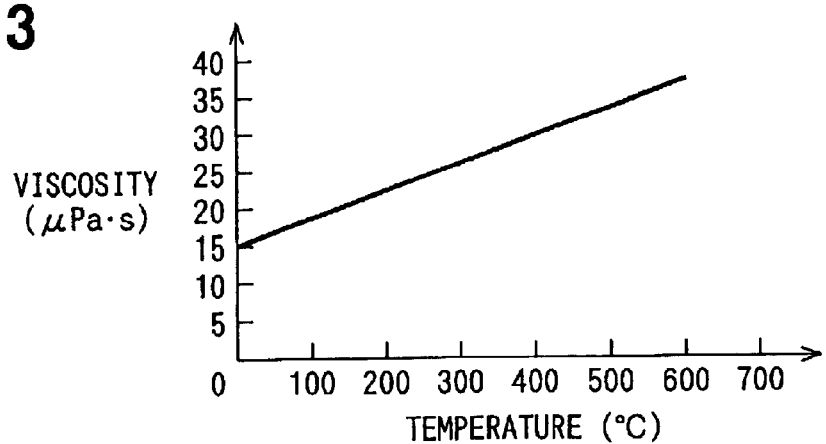
FIG. 3 is a graph showing an example of the relation between the viscosity and temperature of an exhaust gas let out from the internal combustion engine.
Figure 4:
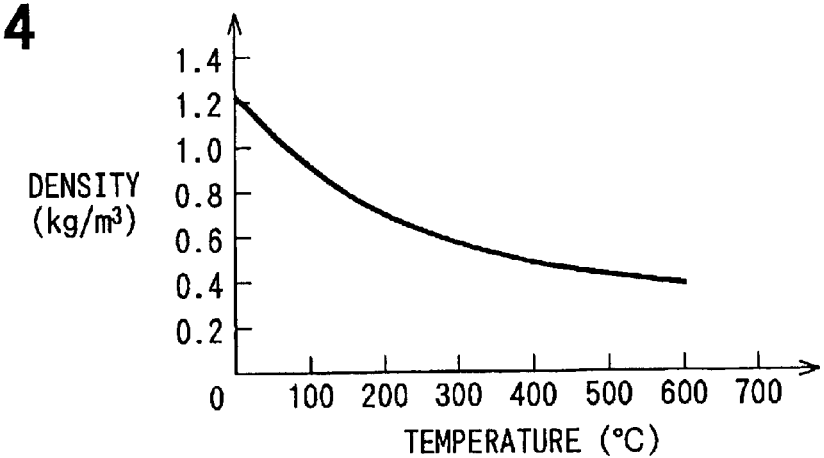
FIG. 4 is a graph showing an example of the relation between the density and temperature of the exhaust gas let out from the internal combustion engine.

In step S103, the viscosity $\mu$ of the exhaust gas is calculated based on the DPF temperature. This is carried out based on a prescribed operation formula or map. FIG. 3 shows the relation between the viscosity and temperature of the exhaust gas. Additionally, in step S103, the density $\rho$ of the exhaust gas is calculated based on the DPF temperature. This is performed based on a prescribed operation formula or map. FIG. 4 shows the relation between the density and temperature of the exhaust gas.

In step S104, the quantity of the deposited fine exhaust particles (hereinafter referred to as "PM deposited quantity") is calculated. As the formula for calculating the PM deposited quantity, the following expressions (2-1) and (2-2) are stored in the ROM. In these expressions, ML is the deposited quantity, ΔP is the pressure loss, and v is the flow velocity. In expression (2-1), A1, B1, C1, and D1 are constants, and in expression (2-2), A2, B2, C2, and D2 are constants.

$$ML=[\Delta P-(A1\mu v+C1\rho v^2)]/(B1\mu v+D1\rho v^2) \quad (2\text{-}1)$$

$$ML=[\Delta P-(A2\mu v+C2\rho v^2)]/(B2\mu v+D2\rho v^2) \quad (2\text{-}2)$$

Now, Expressions (2-1) and (2-2) will be described.

The inventors have researched and studied the relation between the deposition of fine exhaust particles in a particulate filter and its effect upon the flow of exhaust gas, and have found the following relation. In the particulate filter 32, the relation represented by the model equation, expression (3), is established between the pressure loss ΔP and the flow velocity v. The coefficients M and N take a larger value when the PM deposited quantity is larger.

$$\Delta P=M\mu v+N\rho v^2 \quad (3)$$

Figure 5:
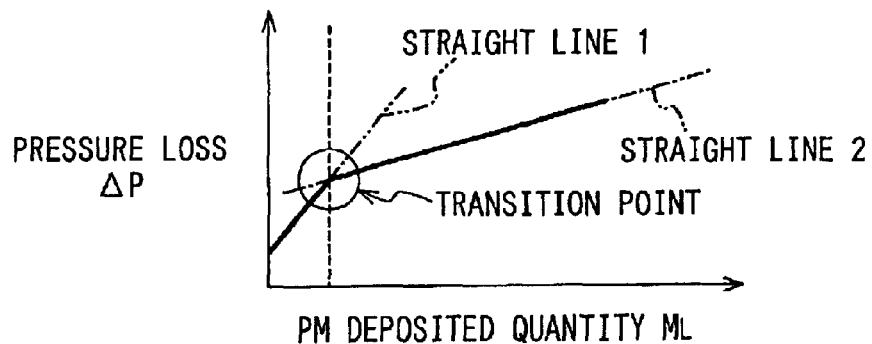
FIG. 5 is a graph showing the relation between the quantity of fine exhaust particles deposited in the particulate filter and the pressure loss.

It has also been found that the pressure loss ΔP changes as a linear function of the PM deposited quantity ML. As shown in FIG. 5, the inclination of the fluctuation changes at a point (hereinafter referred to as the "transition point") where the PM deposited quantity ML is a certain value (hereinafter referred to as the "transition point deposited quantity").

Figure 6A:
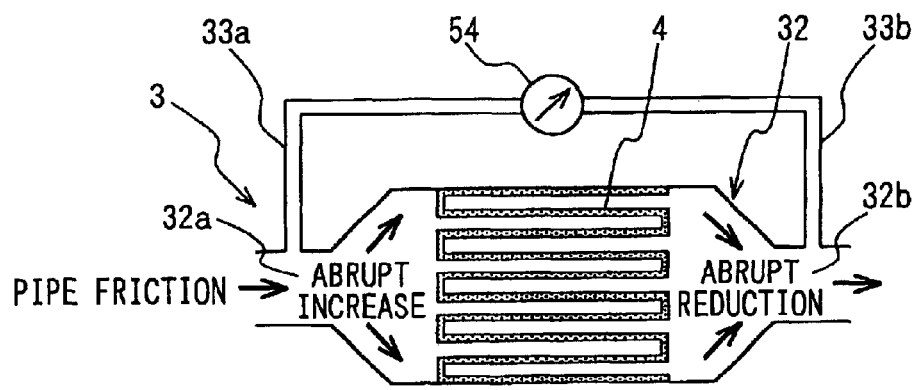
FIG. 6A shows how an exhaust gas is distributed in the particulate filter in the exhaust gas cleaning device.
Figure 6B:
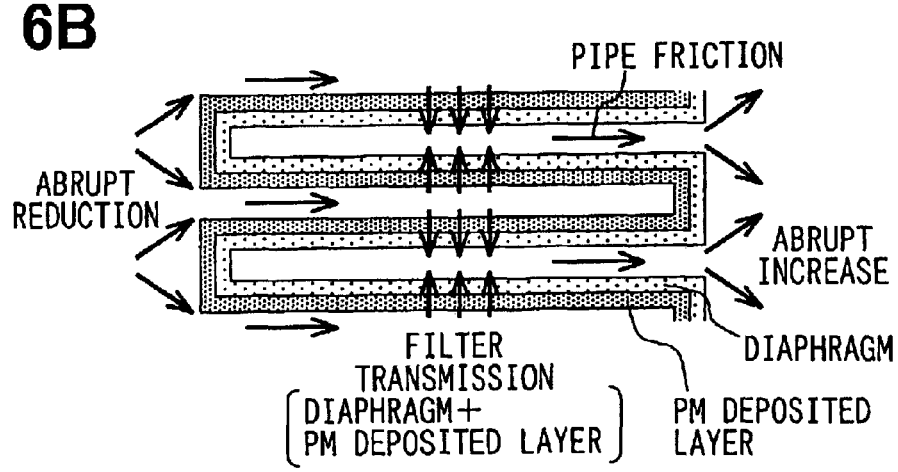
FIG. 6B is an enlarged view of the particulate filter of FIG. 6A showing how an exhaust gas is distributed in the particulate filter in the exhaust gas cleaning device.

The inventors have confirmed that this conclusion can also be derived from a theoretical model for the pressure loss in the particulate filter 32. FIGS. 6A and 6B show the inside of the particulate filter 32. FIG. 6A shows a general view of the particulate filter while FIG. 6B shows an enlarged view of the particulate filter 32. During the period in which exhaust gas is taken in at the inlet 32a and comes out from the outlet 32b, a pressure loss is caused by friction in the pipe and an abrupt increase or reduction in the path cross-sectional area as the gas passes through the diaphragm of the main filter body 4. Now, the pressure loss ΔPi will be described.

Pressure Loss by Friction in the Path

Expression (4) is established for the pressure loss ΔPi, wherein λ is a coefficient representing the degree of loss, l is the length of the path, d is the diameter of the path, and g is the gravitational constant.

$$\Delta Pi/(\rho g)=\lambda(l/d)(v^2/2g) \quad (4)$$

Here, when Re is the Reynolds number, $\lambda=64/Re$, $Re=vd/r$, and $r=\mu/\rho$ for a laminar flow. Thereby, Expression (4) can be rewritten into Expression (5) wherein α a is a coefficient.

$$\Delta Pi=\alpha\mu v \quad (5)$$

Pressure Loss by Abrupt Reduction in Path Cross-sectional Area

Expression (6) is established for the pressure loss ΔPi wherein ζ is a coefficient representing the degree of loss.

$$\Delta Pi/(\rho g)=\zeta(v^2/2g) \quad (6)$$

Therefore, Expression (6) can be rewritten into Expression (7) wherein β is a coefficient.

$$\Delta Pi=\beta\rho v^2 \quad (7)$$

Pressure Loss by Abrupt Reduction in Path Cross Sectional Area

Expression (8) is established for the pressure loss ΔPi wherein ξ is a coefficient representing the degree of loss.

$$\Delta Pi/(\rho g)=\xi(v^2/2g) \quad (8)$$

Therefore, Expression (8) can be rewritten into Expression (9) wherein γ is a coefficient.

$$\Delta Pi=\gamma\rho v^2 \quad (9)$$

Pressure Loss by Passing Diaphragm of Main Filter Body

Expression (10) is established for the pressure loss ΔPi. This is known as "Ergun equation." In this expression, k1 and k2 are coefficients, ε is porosity, S is the surface area/volume of the porous member, and L* is the thickness of the transmission layer.

$$\Delta Pig=k1[(1-\epsilon)2/\epsilon^3]S2L^*\mu v+k^2[(1-\epsilon)/\epsilon3]SL^*\rho v^2 \quad (10)$$

Expression (10) is valid both for the diaphragm of the main filter body 4 (differential pressure ΔPiW) and the PM deposited layer (differential pressure ΔPiS), and therefore can be represented by expressions (11-1) and (11-2), wherein L is the thickness of the PM deposited layer.

$$\Delta PiW=\delta W\mu v+\eta W\rho v^2 \quad (11\text{-}1)$$

$$\Delta PiS=(\delta S\mu v+\eta S\rho v^2)L \quad (11\text{-}2)$$

The pressure loss detected by the differential sensor 54 can be produced by adding up the pressure losses ΔPi, ΔPiW, and ΔPiS, and thus expression (3) is established. As the PM deposited quantity is larger, the PM deposited layer is thicker, and therefore (for larger PM deposited quantities) M and N are greater. Note that in the expressions representing the pressure losses ΔPi, ΔPiW, and ΔPiS, the terms for flow velocity upstream and downstream of the particulate filter 32 are ignored. This is because the flow velocity is insignificant as compared to the flow velocity inside the particulate filter 32.

When L=aML, expressions (12-1) and (12-2) are established.

$$M=\alpha+\delta w+\delta SL=\alpha+\delta w+\delta SaML \quad (12\text{-}1)$$

$$N=\beta+\delta S+\eta SL=\beta+\delta s+\eta SaML \quad (12\text{-}2)$$

When expressions (12-1) and (12-2) are rewritten into expressions (13-1) and (13-2), expression (3) can be rewritten into expression (14), wherein A, B, C, and D are constants.

$$M=A+BML \quad (13\text{-}1)$$

$$N=C+DML \quad (13\text{-}2)$$

$$\Delta P=(A\mu v+C\rho v^2)+(B\mu v+D\rho v^2)ML \quad (14)$$

Expression (14) can be modified into expression (15).

$$ML=[\Delta P-(A\mu v+C\rho v^2)]/(B\mu v+D\rho v^2) \quad (15)$$

Figure 7A:
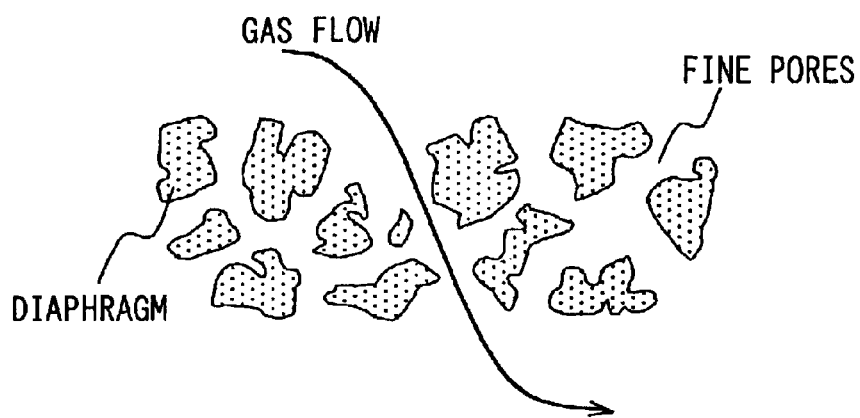
FIG. 7A shows how fine exhaust particles in a first quantity are deposited in the particulate filter in the exhaust gas cleaning device.
Figure 7B:
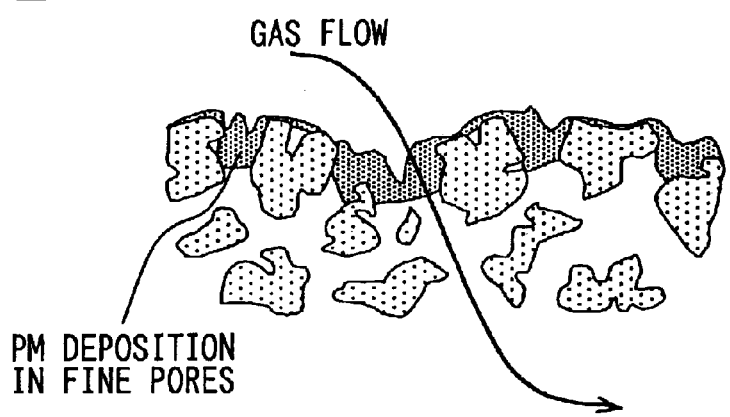
FIG. 7B shows how fine exhaust particles in a second quantity are deposited in the particulate filter in the exhaust gas cleaning device.
Figure 7C:
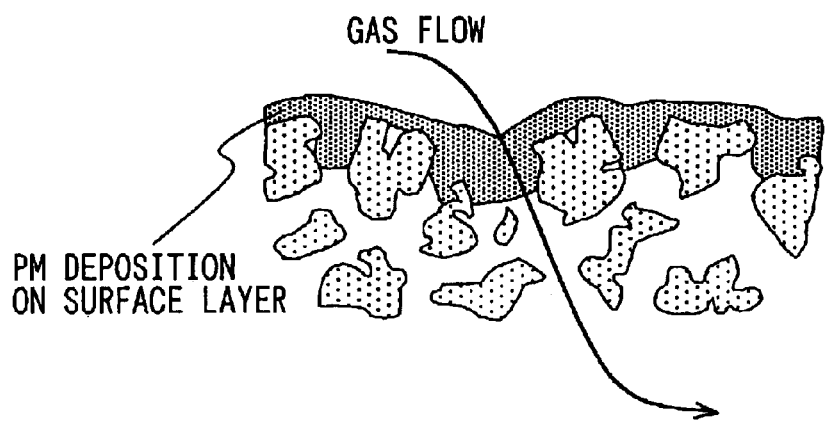
FIG. 7C shows how fine exhaust particles in a third quantity are deposited in the particulate filter in the exhaust gas cleaning device.

Herein, how the change ratio of the pressure loss $\Delta P$ is different between before and after the transition point deposited quantity in FIG. 5 will be described. FIGS. 7A, 7B, and 7C show how fine exhaust particles are deposited on the diaphragm surface of the particulate main filter body 4. The PM deposited quantity increases in order from FIG. 7A to FIG. 7C.

FIG. 7A shows a particulate filter 32 that is either new or has been completely recycled, that is, cleaned, since it is without fine exhaust particles. The pressure loss, as the fine exhaust particles pass through the diaphragm of the particulate main filter body 4, is defined by the shape of particulate filter 32 and the like.

From this state, as shown in FIG. 7B, fine exhaust particles are deposited on the surface of the diaphragm and fill the fine pores, thereby increasing the pressure loss. However, as shown, the exhaust gas flows toward the fine pores as denoted by the arrow, and thus the filled pores are a chief cause for the pressure loss.

When most of the fine pores are filled, and the PM deposited layer is formed on the entire surface, the thickness of the PM deposited layer increases as shown in FIG. 7C. Here, the thickening of the PM deposited layer covering the entire diaphragm surface is a chief cause for the pressure loss.

In this way, the chief causes for the pressure loss are different between a preceding range (first range) and a subsequent range (second range)—before and after the transition point—where most of the fine pores are filled and a PM deposited layer is formed on the entire surface. The fine pores allow a smooth flow when they are not filled with fine exhaust particles. When the pores are filled with captured fine particles, the pressure loss abruptly increases. Therefore, the change ratio of the pressure loss relative to the PM deposited quantity is relatively large before most of the fine pores are filled, as shown in FIG. 5 (straight line 1). Meanwhile, after most of the pores are filled, the chief cause for the pressure loss is the thickening of the PM deposited layer, and the change ratio of the pressure loss relative to the PM deposited quantity becomes lower (straight line 2).

Expression (14) aptly represents how the pressure loss linearly changes relative to the PM deposited quantity. However, in consideration of the different chief causes before and after the transition point, two values are considered for each of A, B, C, and D. The resulting different expressions can be used as required, so that the PM deposited quantity can be determined with high accuracy in a wide range. The different expressions are expressions (2-1) and (2-2). A1, B1, C1, and D1 in expression (2-1) are A, B, C, and D adapted to the first range, while A2, B2, C2, and D2 in expression (2-2) are A, B, C, and D adapted to the second range.

In the control flow, it is determined whether or not the deposited quantity calculated according to expression (2-1) is above a reference value. Then, if the quantity is above the reference value, the deposited quantity is again calculated according to expression (2-2) in the next step. Besides this control flow, a determination according to expression (2-2) may precede the calculation according to expression (2-1).

Figure 8A:
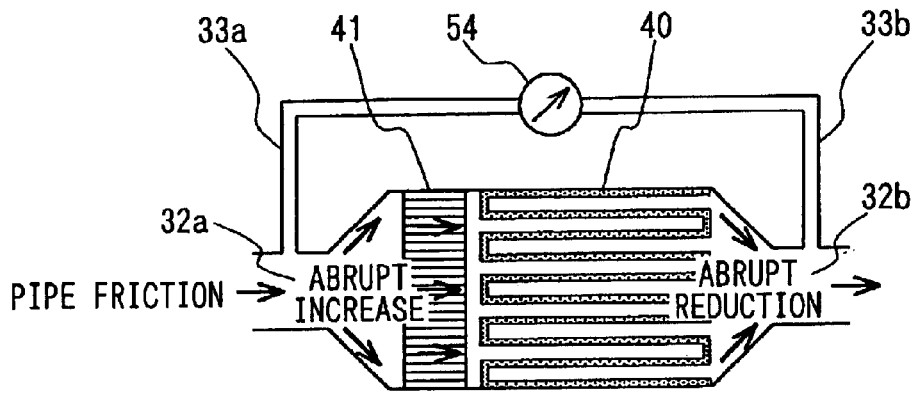
FIG. 8A shows how an exhaust gas flows through a particulate filter having a different structure.
Figure 8B:
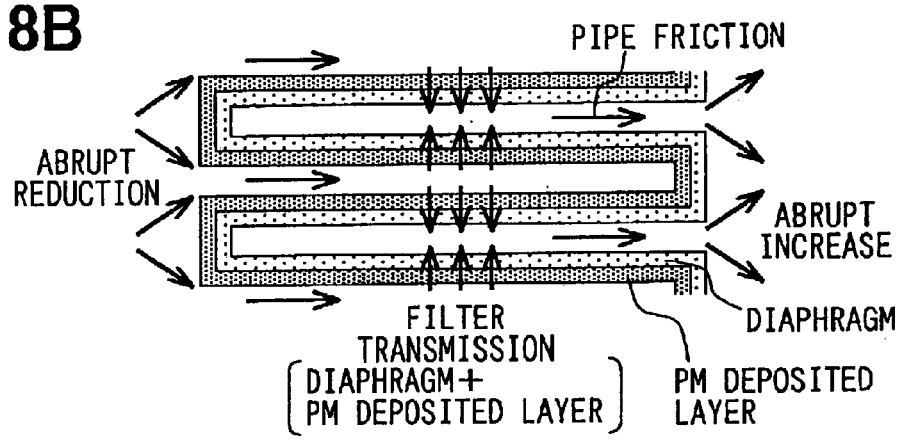
FIG. 8B is an enlarged view of the particulate filter of FIG. 8A showing how an exhaust gas flows through the particulate filter having a different structure.

Data on the deposited quantity in the transition point, i.e. the reference value, is previously obtained from experiments and stored. As shown in FIG. 8A, when flow through monolith carrier 41 is provided upstream of a main filter body 40 with no oxidation catalyst carried thereon, in other words, in a structure having a catalyst in a preceding stage, there is still pipe friction in the flow through monolith carrier 41. Abrupt reduction in cross section occurs at the inlet of the flow through the monolith carrier 41, while abrupt increase occurs at the outlet. Regardless of the structure of the particulate filter, the pressure loss $\Delta P$ is represented similarly by expressions (2-1), (2-2), and (14). FIG. 8B shows an enlarged view of the flow through the main filter body 40 of FIG. 8A.

In step S104, a PM deposited quantity ML is calculated according to expression (2-1) adapted to the first range. In step S105, the calculated PM deposited quantity ML is compared to the PM deposited quantity in the transition point, and it is determined whether the PM deposited quantity ML is smaller than the transition point deposited quantity.

If the result of determination is affirmative, the control proceeds to step S106, in which it is determined whether or not the PM deposited quantity ML≧the reference deposited quantity MLth. The reference deposited quantity MLth is set in consideration of an upper limit value for the deposited quantity that allows the particulate filter to be kept from being recycled because the engine back pressure or output thereof is not too low.

If the result of determination in step S106 is negative, the control returns to step S101, and the process after step S101 is repeated.

When more fine exhaust particles have been deposited in the particulate filter 32, the result of the determination in step S105 is negative. When the result is negative, the control proceeds to step S108, and the PM deposited quantity ML is calculated according to expression (2-2) adapted to the second range after the transition point. In this way, the PM deposited quantity can be more accurately determined.

If the result of determination in step S106 is affirmative, the control proceeds to step S107, and the particulate filter 32 is recycled. This is carried out, for example, by post injection.

In this way, in the exhaust gas cleaning device according to the invention, the determined PM deposited quantity is more accurate so that the particulate filter 32 can be recycled in a more appropriate timing schedule. Therefore, premature recycling that diminishes fuel efficiency can be prevented. Meanwhile, a delay in recycling that lowers the output of the internal combustion engine, or abnormally raises the temperature in the particulate filter 32, can be prevented. Furthermore, since expressions (2-1) and (2-2) need only be stored, the amount of the data is not so significant as that of the map.

Figure 9:
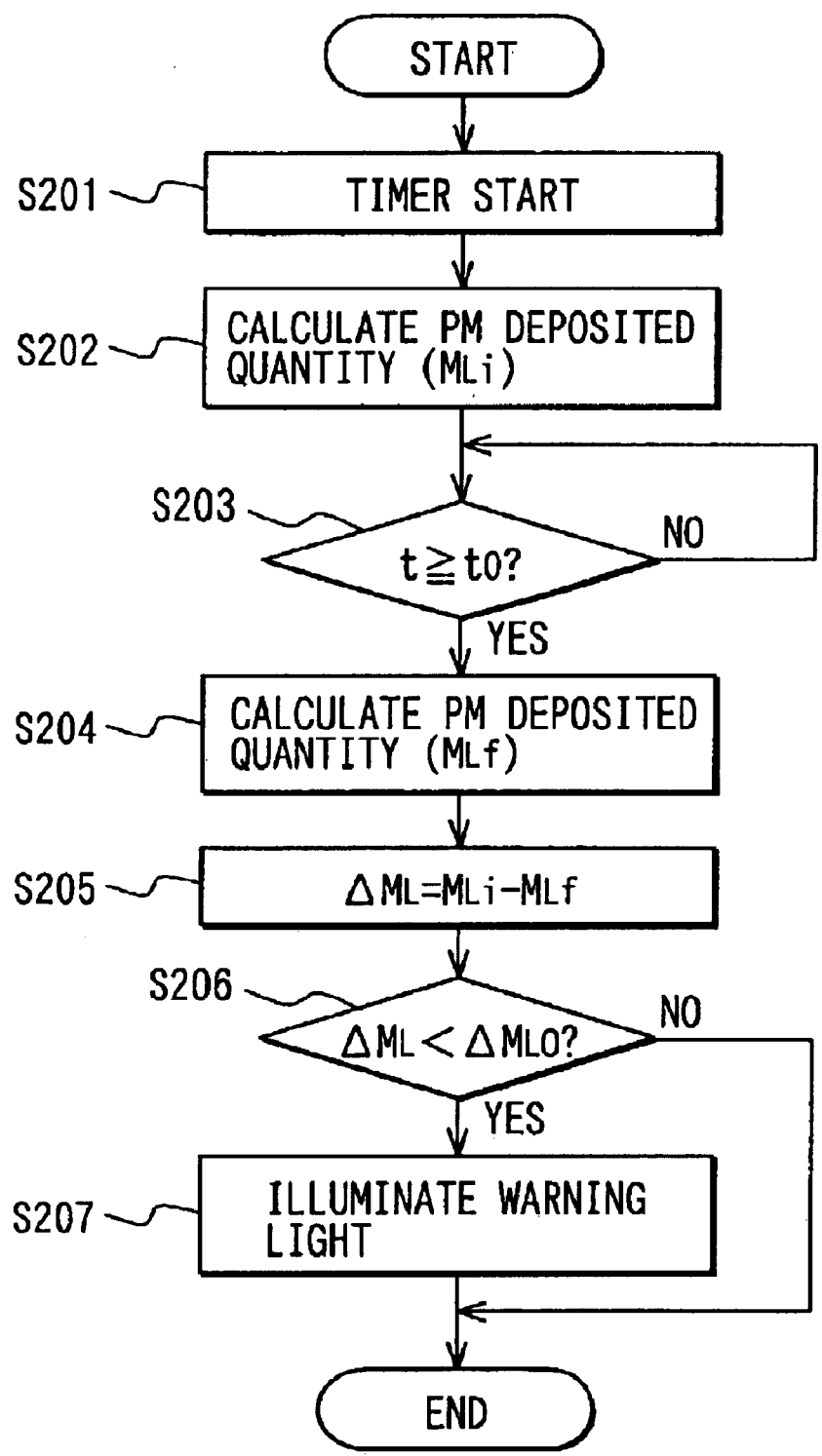
FIG. 9 is a second flow chart for use in illustrating the content of control carried out by an ECU that controls various parts in the internal combustion engine.

Another control flow carried out by the ECU 51 is shown in FIG. 9. This is carried out at the time of recycling the particulate filter 32, and started in response to the start of the recycling. Steps S201 to S205 are a process representing the means for detecting any reduction in the deposited quantity.

To begin with, a counting operation of the timer is started in step S201, the PM deposited quantity is calculated according to expression (2-2) in step S202, and the value is referred to as a pre-transition value MLi. In step S203, the count value t of the timer is compared to predetermined reference time t0, and it is determined whether or not the count value t has reached the reference time t0. If the result of the determination is affirmative, i.e., if the reference time has passed, the control proceeds to step S204.

In step S204, the PM deposited quantity is calculated according to expression (2-2), and the value is referred to as a post-transition value MLf. Instep S205, the difference ΔML between the PM deposited quantities is calculated according to expression (16).

$$\Delta ML = MLi - MLf \tag{16}$$

In step S206, which is a process representing the means for determining any degradation of the catalyst, it is determined whether or not the difference ΔML is smaller than the threshold value ΔML0. If the result of the determination is affirmative, a warning light 55 is flashed in step S207, and the flow ends. If the result of the determination in step S206 is negative, step S207 is skipped and the flow ends.

Figure 10:
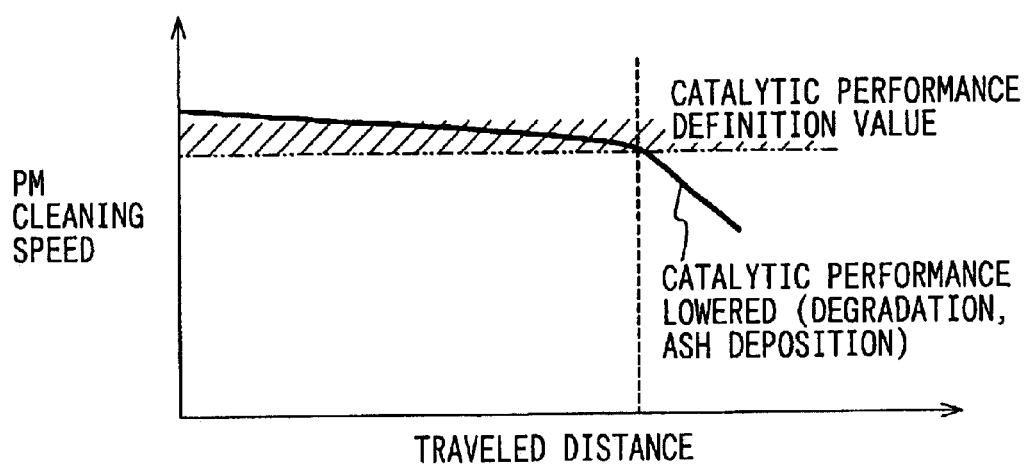
FIG. 10 is a graph showing the relation between the traveled distance and the speed of cleaning fine exhaust particles at the time of recycling the particulate filter.

The difference ΔML between the PM deposited quantities is a reduction in the PM deposited quantity in the fixed time period t0, and indicates how fast the recycling proceeds. This is smaller and slower when the catalyst carried by the particulate main filter body 4 is further degraded. The speed is gradually lowered as a consequence of degradation over time, for example, as the traveled distance increases as shown in FIG. 10.

The threshold value ΔML0 is set to a lower limit value for the difference ΔML at which the catalyst can be regarded as normal (that corresponds to the catalytic performance definition value in the figure), so that any abnormality in the catalyst can be prevented or the operator can appropriately be notified of the time for its exchange.

It should be noted that the control flow is carried out with the start of the recycling of the particulate filter 32, and the recycling is started when the PM deposited quantity reaches the upper limit deposited quantity MLth. Therefore, the pre-transition value MLi is approximately equal to the upper limit deposited quantity MLth. Therefore, a reduction in the PM deposited quantity can always be detected approximately in the same condition, while the counter may be started once the PM deposited quantity reaches a predetermined value. In this case, the PM deposited quantity for which the counter is started may be set to a value which is smaller than the upper limit deposited quantity MLth by a particular amount. The measurement may take place as combustion for the PM deposited quantity is in full progress. In this case, the PM deposited quantity for which the counter is started may be in the first range. It should be understood that expressions (2-1) and (2-2) used for calculating the PM deposited quantity are switched between before and after the transition point.

Rather than detecting the change in the PM deposited quantity after the reference time t0, the time between when two predetermined PM deposited quantities are attained may be counted. When the elapsed time is longer than the reference time, it may be determined that the oxidation catalyst is degraded.

It should be noted that according to the embodiment, the PM deposited quantity is calculated based on the viscosity $\mu$ and the density $\rho$ which are calculated based on the pressure loss ΔP, the volume flow rate V, the DPF inlet temperature, and the DPF outlet temperature. The necessity of recycling is determined based on the value of the PM deposited quantity. Meanwhile, any method using expression (3) may be applied. For example, M and N are set to values corresponding to the reference PM deposited quantity that necessitates recycling in order to calculate $\Delta P(v, \mu, \rho) = M\mu v + N\rho v^2$. Then, it is determined whether or not a determination formula, $\Delta P \geq \Delta P(v, \mu, \rho)$ is established. If recycling is not necessary, $\Delta P < \Delta P(v, \mu, \rho)$ holds and the formula is not established. If the recycling is necessary, the formula $\Delta P \geq \Delta P(v, \mu, \rho)$ is established.

According to the embodiment, $\mu$ and $\rho$ are calculated based on the DPF inlet temperature and the DPF outlet temperature detected by the two temperature sensors, though the calculation may be based only on the temperature of one of the temperature sensors. In this case, a temperature produced by adding/subtracting a prescribed offset temperature to/from the detected temperature may be set as the DPF temperature. Alternatively, the viscosity $\mu$ and/or the density $\rho$ may be a fixed value. It is understood that when one of the values is fixed, the value less dependent on the PM deposited quantity is set as a fixed value.

The increase in the volume flow rate by fuel injection is taken into account in expression (1), but depending on the requested specification, the first term of expression (1) may be the volume flow rate of the exhaust gas. Rather than calculating the volume flow rate of the exhaust gas by using the intake air quantity detected by the airflow meter 52, the flow velocity may directly be detected by a flow velocity detecting sensor provided in the exhaust path 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust gas cleaning device for an internal combustion engine having a particulate filter provided in an exhaust path for capturing fine exhaust particles, comprising:

differential pressure detecting means for detecting a differential pressure between pressure at an inlet side and pressure at an outlet side of said particulate filter;

flow velocity detecting means for detecting a flow velocity of an exhaust gas flowing through said particulate filter; and recycling determining means for determining whether or not to recycle said particulate filter according to a determination formula that determines a value of a deposited quantity of fine exhaust particles in said particulate filter based on the detected differential pressure and flow velocity, wherein said determination formula is equivalent to formula:

$$\Delta P \geq M\mu v + N\rho v^2,$$

wherein ΔP is said differential pressure, v is said flow velocity, $\mu$ is a viscosity of the exhaust gas distributed in said particulate filter, $\rho$ is a density of said exhaust gas, and M and N are constants, and said particulate filter is permitted to be recycled when said determination formula is satisfied.

2. The exhaust gas cleaning device according to claim 1, wherein
said recycling determining means allows the deposited quantity to be calculated by a determination formula according to:

$$ML=[\Delta P-(A\mu v+C\rho v^2)]/(B\mu v+D\rho v^2),$$

wherein ML is a deposited quantity, and A, B, C, and D are constants, and said determination formula is used to compare the calculated deposited quantity value and a predetermined deposited quantity.

3. The exhaust gas cleaning device according to claim 2, wherein
said recycling determining means stores a first calculation formula and a second calculation formula for the deposited quantity having different values for the constants A, B, C, and D, the first calculation formula is adapted to a deposited quantity in a range less than a predetermined reference value, while the second calculation formula is adapted to a deposited quantity within a range equal to or more than said reference value, and when the deposited quantity calculated according to one calculation formula is out of the range of the deposited quantity to which the calculation formula is adapted, the deposited quantity is calculated again according to the other calculation formula.

4. The exhaust gas cleaning device according to claim 3, wherein
said particulate filter has an oxidation catalyst for oxidizing and burning the fine exhaust particles deposited therein, said device further comprising:

means for detecting reduction in the calculated deposited quantity during the recycling of said particulate filter; and catalyst degradation determining means for determining said oxidation catalyst as being further degraded when the calculated deposited quantity is more slowly reduced.

5. The exhaust gas cleaning device according to claim 4, further comprising:

temperature detecting means for detecting a temperature of the exhaust gas that flows through the particulate filter, wherein said recycling determining means is set to obtain said viscosity $\mu$ based on the detected temperature according to previously stored relation between the viscosity and the temperature of the exhaust gas.

6. The exhaust gas cleaning device according to claim 5, further comprising:

temperature detecting means for detecting a temperature of the exhaust gas that flows through said particulate filter, wherein said recycling determining means is set to obtain said density $\rho$ based on the detected temperature according to a previously stored relation between the density and the temperature of the exhaust gas.

7. The exhaust gas cleaning device according to claim 6, wherein said flow velocity detecting means comprises:

intake air quantity detecting means for detecting a quantity of air taken into the internal combustion engine; and correcting means for adding a volume increase caused by combustion of injected fuel to the intake air quantity, thereby producing a volume flow rate of the exhaust gas that flows through said particulate filter, said volume flow rate being convertible into a flow velocity.

\* \* \* \* \*